Dec. 20, 1966  J. L. S. DALEY  3,293,081
VENTING MEANS FOR A GALVANIC CELL
Filed Jan. 3, 1964  2 Sheets-Sheet 1

INVENTOR.
JOHN L. S. DALEY
BY
ATTORNEY

Dec. 20, 1966  J. L. S. DALEY  3,293,081
VENTING MEANS FOR A GALVANIC CELL
Filed Jan. 3, 1964  2 Sheets-Sheet 2
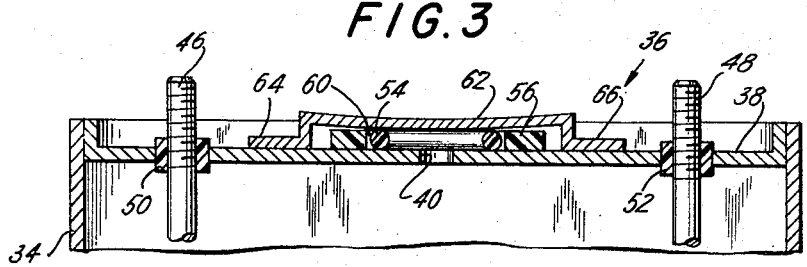
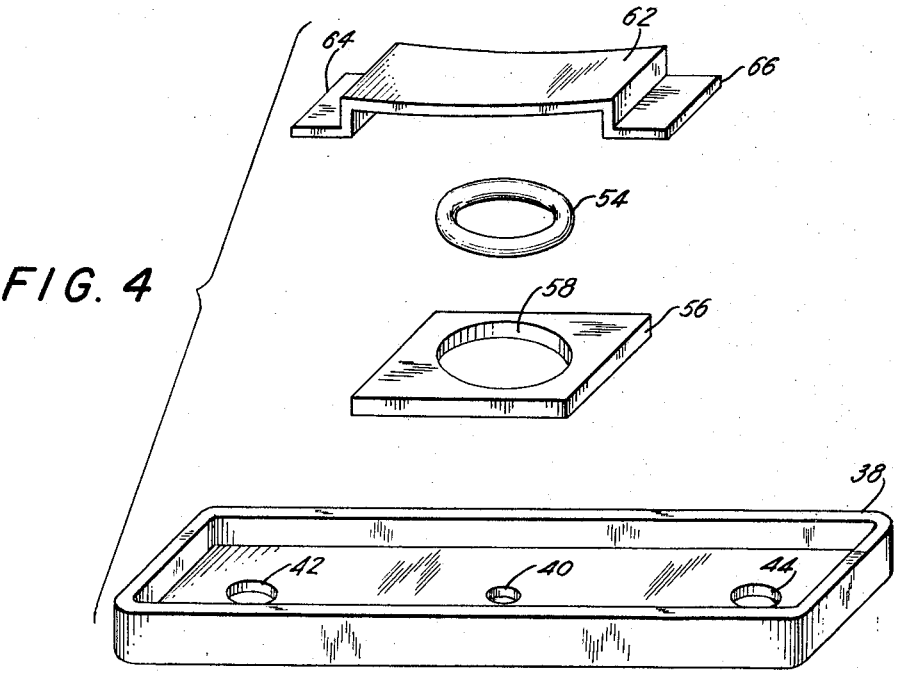
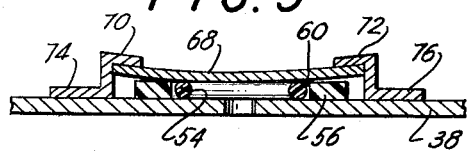
INVENTOR.
JOHN L. S. DALEY
BY
ATTORNEY United States Patent Office 3,293,081
Patented Dec. 20, 1966

3,293,081
VENTING MEANS FOR A GALVANIC CELL
John L. S. Daley, Bay Village, Ohio, assignor to Union Carbide Corporation, a corporation of New York
Filed Jan. 3, 1964, Ser. No. 335,510
12 Claims. (Cl. 136—178)

This invention relates to galvanic cells and more particularly to cells having means for relieving gas pressure therein.

Rechargeable galvanic cells, such as nickel-cadmium cells, for instance, are widely used as a power source in portable appliances. The cells are sealed to prevent the loss of electrolyte by leakage or by evaporation and to prevent the escape of gases generated by decomposition, and thus exhibit a relatively long life. However, under conditions of charging, overcharging or overdischarging at excessive current, the cells evolve gases from the electrodes. These gases may not be capable of recombining rapidly enough to maintain equilibrium within the cell, and thus may create dangerous pressures therein which may be possibly as high as the bursting pressure of the cell container. Thus, a safety gas-relief valve for rechargeable galvanic cells is desirable. The relief valve, however, must be inexpensive and must prevent electrolyte leakage and gas venting until excessive pressures within the cell container have been reached.

Accordingly, the primary object of this invention is to provide a gas-venting means for a galvanic cell which operates only at a predetermined pressure.

Another object of this invention is to provide a galvanic cell having incorporated therein a gas-venting means which operates at a predetermined pressure but which requires a minimum of additional cell components and involves small additional cost.

Still another object of this invention is to provide a galvanic cell having incorporated therein a gas-venting means which does not change the normal appearance of the cell.

In the drawings:

FIGURE 3 is similar to FIGURE 1 showing another type of galvanic cell incorporating the gas-venting means of the invention;

FIGURE 4 is similar to FIGURE 2 showing the individual parts of the gas-venting means of FIGURE 3; and FIGURE 5 is a sectional view of a modification of the venting means of FIGURES 3 and 4.

Broadly, the above objects are achieved by a normally sealed galvanic cell comprising a container and a closure therefor, the closure sealing the open end of the container. The closure may support at least one terminal for the cell and may suitably be provided with an aperture for venting gases from within the container. Venting means are provided in association with the aperture in the closure for permitting gas relief of excessive pressure from the container while preventing electrolyte leakage and gas relief at lower pressures. This galvanic cell is capable of gas relief at a predetermined pressure and involves only a minimum of additional components in order to accomplish gas relief of excessive pressures which may occur in the cell.

According to one embodiment of the invention, a normally sealed galvanic cell of the conventional type may be provided with venting means comprising an annular gasket fitted against the closure and around the aperture therein, gasket retaining means surrounding the annular gasket and a terminal cap for the cell positioned over the annular gasket and suitably attached to the closure. The terminal cap has an arched top which overlies the annular gasket in pressure contact therewith. This arrangement offers the advantage in that the terminal cap, which is one of the usual components of the cell, incorporates the venting means therein, and the normal appearance of the galvanic cell is not changed.

According to another embodiment of the invention, a normally sealed flat type galvanic cell usually employed in a battery stack of cells an having a non-polarized container, including the closure, may be provided with gas-venting means comprising an annular gasket fitted against the closure and around the aperture therein, a gasket retaining means surrounding the annular gasket and a resilient means positioned over the gasket in pressure contact therewith. Preferably, the resilient means is a generally elongated arched spring having flanged members attached to the closure. The terminals for the cell extend through the closure and are electrically insulated therefrom, suitably by insulating seal gaskets.

Figure 1:
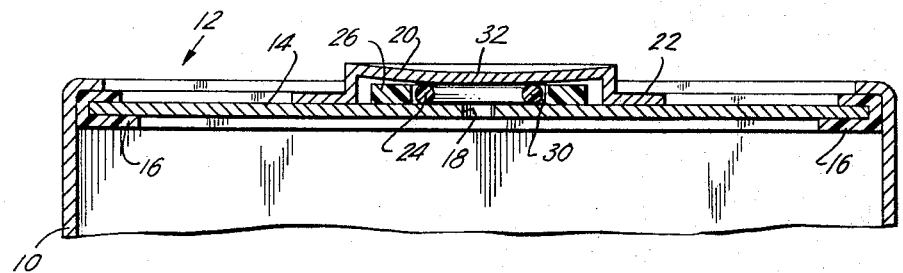
FIGURE 1 is a fragmentary sectional view of a galvanic cell having incorporated therein a gas-venting means embodying the invention.
Figure 2:
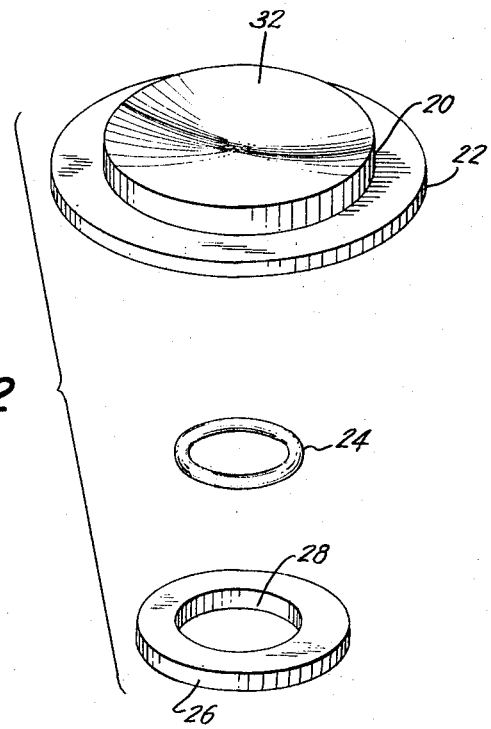
FIGURE 2 is an exploded view of the individual parts of the gas-venting means used in the cell of FIGURE 1.

Referring now to the drawings and particularly to FIGURES 1 and 2, a normally sealed galvanic cell embodying the invention comprises a container 10 having an open end sealed by a closure 12. The closure 12 comprises a rigid cover 14 having a shape which fits in the open end of the container 10 and a seal gasket 16 which fits between the cover 14 and the container 10 to seal the junction therebetween. This seal is preferably effected by radially forcing the container 10 in at the area adjacent the cover 14 until the seal gasket 16 is compressed. The outermost edge of the container 10 is then curled over to form a smooth junction.

An aperture 18 is positioned in the cover 14, and a terminal cap 20 having a flnaged edge 22 is attached to the cover 14 in a position overlying the aperture 18. The terminal cap 20 is preferably spot welded to the cover 14 at the flanged edge 22. An annular gasket 24, preferably an O-ring, is disposed against the cover 14 and around the aperture 18 within the terminal cap 20. Positioned about the periphery of the annular gasket 24 is a retaining means 26 having an opening 28 which is slightly larger in diameter than the gasket 24, defining a free space 30 between the gasket 24 and the retaining means 26. The retaining means 26 is preferably a flat plastic ring having a thickness which is slightly less than that of the annular gasket 24. By this construction, it will be seen that while the annular gasket 24 is disposed within the opening 28 of the retaining means 26, the gasket 24 can move radially when expanded in the free space 30 between the retaining means 26 and the gasket 24.

As shown more clearly in FIGURE 1, the terminal cap 20 has a slightly concavely shaped or arched top 32 which is positioned over the annular gasket 24 in pressure contact therewith. The top 32 of the terminal cap 20, which acts as an arched spring, compresses down on the annular gasket 24 which is in turn forced against the cover 14, thereby effecting a seal between the top 32 of the terminal cap 20 and the gasket 24 and between the gasket 24 and the cover 14.

When excessive pressure develops within the container 10, the annular gasket 24 is forced to move radially or to expand in the free space 30 until it contacts the periphery or wall of the opening 28 in the retainer means 26. The top 32 of the terminal cap 20 is properly set at a spring pressure which will allow upward movement thereof at a higher predetermined pressure in order to permit the gases within the container 10 to vent through the aperture 18 in the cover 14 and past the annular gasket 24. The gases may follow a path either from between the top 32 of the terminal cap 20 and the gasket 24 or from between the gasket 24 and the cover 14, and of course may vent through both possible paths. Since the terminal cap 20 is preferably spot welded to the cover 14, the gases may then vent to the atmosphere through the openings left between the spot welds on the flanged edge 22 of the terminal cap 20 and on the cover 14. Upon relief of the gas pressure in the container 10, both the annular gasket 24 and the top 32 of the terminal cap 20 return to normal positions, resealing the aperture 18 and preventing further gas escapement or electrolyte leakage until an excessive predetermined gas pressure again occurs within the container 10.

The gasket 14 should be resilient in order that proper resealing of the venting means of the invention can be attained and may be composed of an elastomeric material, such as neoprene or Buna N rubber. O-rings are conventionally made of these materials. The retaining means 26 may be composed of a hard, rigid plastic which is resistant to cold flow, such as nylon, phenoxy resins, polypropylene and vinyl copolymers.

Since the metal parts of many galvanic cell containers are formed of nickel-plated steel, the metal parts described herein, such as the cover 14 and the terminal cap 20 are preferably formed of nickel-plated steel. Other materials may be used, however, such as rigid plastics which are resistant to cold flow, but electrical conductivity in the appropriate paths must, of course, be maintained. Cell seal gasket 16 is usually made of nylon or other plastics resistant to cold flow.

Although the terminal cap 20 and the cover 14 may be either positively or negatively polarized depending on the particular construction of the cell, it has been found desirable to provide the gas-venting means of the invention on the positively polarized portion of the container in order to avoid electrolyte creepage due to electrocapillary effects. Thus, the terminal cap 20 and the cover 14 are positively polarized in the preferred embodiment of the invention. This is achieved by electrically connecting the cover 14 through means of wire or otherwise to a positively charged component of the cell, e.g., the positive electrode. In a similar manner, the cell container 10 may be electrically connected to a negatively charged component, e.g., the negative electrode, and may then serve as the negative terminal of the cell as will readily occur to those skilled in the art.

Referring now to FIGURES 3 and 4, a normally sealed flat type galvanic cell incorporating the venting means of the invention is shown. The cell comprises a container 34 having a generally rectangular shape and having an open end sealed by a closure 36. The closure 36 comprises a rectangularly cup shaped cover 38 which fits within the open end of the container 34 and which may be sealed thereto, suitably by welding. The cover 38 has an aperture 40 and a pair of larger openings 42, 44 through which extend the positive and negative terminal posts 46, 48 of the cell. Gaskets 50, 52 are disposed around the terminal posts 46, 48 and seal and insulate the posts from the cover 38. With this terminal arrangement, the cell container 34 and the closure 36 are of the non-polarized type and the cell is ideally suited for use in a battery stack of cells, such as disclosed and claimed in my U.S. Patent No. 3,094,438, issued on June 18, 1963.

In the cell of FIGURES 3 and 4, gas-venting means is provided comprising an annular gasket 54, preferably an O-ring, which fits against the cover 38 and around the aperture 40 therein, and a retaining means 56 having an opening 58 which is slightly larger in diameter than the gasket 54, defining a free space 60 between the gasket 54 and the retaining means 56. The retaining means 56 is preferably a flat plastic sheet having a thickness which is slightly less than that of the annular gasket 54. As in the venting means of FIGURES 1 and 2, this construction permits the gasket 54 to move radially when expanded in the free space 60. A resilient means 62 is positioned over the annular gasket 54 and is in pressure contact therewith. The resilient means 62 is preferably a generally elongated, metal arched spring having flanged members 64, 66 which are affixed to the cover 38, suitably by welding. It will be seen that this gas-venting construction, and the sealing arrangement and operation thereof, are substantially identical to that of FIGURES 1 and 2, except that the venting means is not incorporated within a terminal cap and that the gases may vent, in substantially the same manner, directly to the atmosphere.

FIGURE 5 illustrates a modification of the venting means just described. In this modification, a generally elongated, flat, arched spring 68 is positioned over the annular gasket 54 and the retaining means 56. The flat spring 68 is held in place by a pair of angles 70, 72 having flanged members 74, 76 affixed to the cover 38, suitably by welding. This construction offers the advantage in that the pair of angles 70, 72 may first be secured to the cover 38 and the spring 68 assembled later, whereby the difficulty of welding while the spring is under pressure is avoided.

It will be apparent that the invention provides a gas-venting means for a normally sealed galvanic cell without need for complicated parts and which may be easily assembled and produced at a minimum cost. Additionally, the venting means of the invention may be incorporated in a galvanic cell without radically changing the normal appearance of the cell. Furthermore, it has been found that the desired pressure at which the venting means should operate can be maintained with a minimum of variation and that the venting means will reseal after a relatively small drop below the opening pressure.

What is claimed is:

1. A normally sealed galvanic cell capable of gas relief at a predetermined pressure, said cell comprising a container and a closure sealing one end of said container, said closure comprising a rigid cover having a shape which fits in said end of said container and having an aperture therein, an annular gasket disposed against said cover and around said aperture, a retaining means disposed around the periphery of said annular gasket and spaced therefrom so as to define a free space for radial movement of said annular gasket, and resilient means positioned over said annular gasket in pressure contact therewith and set to permit gas relief at a predetermined pressure from within said container said aperture and past said annular gasket, but to prevent gas relief from said container at pressures below said predetermined pressure.

2. A normally sealed galvanic cell capable of gas relief at a predetermined pressure, said cell comprising a container and a closure sealing one end of said container, said closure comprising a rigid cover having a shape which fits in said end of said container and having an aperture therein, a seal gasket disposed around the periphery of said cover and sealing the junction between said container and said cover of said closure, an annular gasket disposed against said cover and around said aperture, a retaining means disposed around the periphery of said annular gasket and spaced therefrom so as to define a free space for radial movement of said annular gasket, and a terminal cap attached to said cover over said aperture, annular gasket and retaining means and having an open venting means associated therewith, the top of said terminal cap being of an arched shape and being positioned over said annular gasket in pressure contact therewith so as to act as a spring set to permit gas relief at a predetermined pressure from within said container through said aperture and past said annular gasket, but to prevent gas relief from said container at pressures below said predetermined pressure.

3. The normally sealed galvanic cell defined in claim 2 wherein said cover and said terminal cap are made of nickel-plated steel, said seal gasket is made of nylon, and said terminal cap is spot welded to said cover.

4. The normally sealed galvanic cell defined in claim 2 wherein said retaining means is a flat ring having a thickness which is slightly less than that of said annular gasket and which is composed of a material selected from the group consisting of nylon, phenoxy resins, polypropylene and vinyl copolymers.

5. The normally sealed galvanic cell defined in claim 2 wherein said annular gasket is an O-ring composed of a material selected from the group consisting of neoprene and Buna N rubber.

6. A normally sealed galvanic cell capable of gas relief at a predetermined pressure, said cell comprising a container and a closure sealing one end of said container, said closure comprising a rigid cover having a shape which fits in said end of said container and having an aperture therein, terminal posts extending through but insulated from said cover, an annular gasket disposed against said cover and around said aperture, a retaining means disposed around the periphery of said annular gasket and spaced therefrom so as to define a free space for radial movement of said annular gasket, and resilient means positioned over said annular gasket in pressure contact therewith and set to permit gas relief at a predetermined pressure from within said container through said aperture and past said annular gasket, but to prevent gas relief from said container at pressures below said predetermined pressure.

7. The normally sealed galvanic cell defined in claim 6 wherein said container and cover are of a rectangular shape and wherein said cover is welded to said end of said container.

8. The normally sealed galvanic cell defined in claim 6 wherein said resilient means is a generally elongated arched spring having flanged members which are welded to said cover.

9. The normally sealed galvanic cell defined in claim 8 wherein said retaining means is a generally elongated, flat sheet having an opening therein which is slightly larger in diameter than said annular gasket and having a thickness which is slightly less than that of said annular gasket, and wherein said elongated, flat sheet is composed of a material selected from the group consisting of nylon, phenoxy resins, polypropylene and vinyl copolymers.

10. The normally sealed galvanic cell defined in claim 6 wherein said annular gasket is an O-ring composed of a material selected from the group consisting of neoprene and Buna N rubber.

11. A normally sealed galvanic cell capable of gas relief at a predetermined pressure, said cell comprising a container having a positively charged and a negatively charged component therein and a closure sealing one end of said container, said closure comprising a rigid cover having a shape which fits in said end of said container and having an aperture therein, a seal gasket disposed around the periphery of said cover and sealing the juncture between said container and said cover of said closure, said cover being electrically connected to said positively charged component of said cell, an annular gasket disposed against said cover and around said aperture, a retaining means disposed around the periphery of said annular gasket and spaced therefrom so as to define a free space for radial movement of said annular gasket, and a terminal cap having an open venting means associated therewith attached to said cover over said aperture, annular gasket and retaining means and being positively polarized along with said cover, the top of said terminal cap being of an arched shape and being positioned over said annular gasket in pressure contact therewith so as to act as a spring set to permit gas relief at a predetermined pressure from within said container through said aperture and past said annular gasket, but to prevent gas relief from said container at pressures below said predetermined pressure.

12. The normally sealed galvanic cell defined in claim 8 wherein said resilient means is a generally elongated arched spring and wherein said arched spring is maintained in pressure contact with said annular gasket by an angle mounted at opposite ends thereof and having flanged members affixed to said cover.

References Cited by the Examiner

UNITED STATES PATENTS

| | | | |
|---|---|---|---|
| 2,619,255 | 11/1952 | Bricout | 220—44 X |
| 3,002,648 | 10/1961 | Rieke | 220—44 |
| 3,143,441 | 8/1964 | Coleman et al. | 136—133 X |

WINSTON A. DOUGLAS, *Primary Examiner.*

D. L. WALTON, *Assistant Examiner.*